United States Patent
Kim et al.

(10) Patent No.: US 7,929,692 B2
(45) Date of Patent: Apr. 19, 2011

(54) FIRMWARE ENCRYPTING AND DECRYPTING METHOD AND AN APPARATUS USING THE SAME

(75) Inventors: In-koo Kim, Anseong-gun (KR); Jong-gyou Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1399 days.

(21) Appl. No.: 11/030,104

(22) Filed: Jan. 7, 2005

(65) Prior Publication Data

US 2005/0154912 A1    Jul. 14, 2005

(30) Foreign Application Priority Data

Jan. 9, 2004   (KR) .................. 10-2004-0001414

(51) Int. Cl.
*H04L 9/00* (2006.01)
*H04L 29/06* (2006.01)
*G06F 11/30* (2006.01)
*G06F 7/04* (2006.01)

(52) U.S. Cl. ............ 380/44; 380/46; 380/277; 713/165; 713/167; 713/189; 713/190; 713/193; 726/30

(58) Field of Classification Search .......... 380/277–280, 380/286, 44–47; 713/164–167, 187–190, 713/193; 726/26–27, 30
See application file for complete search history.

(56) References Cited

U.S. PATENT DOCUMENTS

| | | | | |
|---|---|---|---|---|
| 4,238,854 A * | 12/1980 | Ehrsam et al. | ................ | 713/165 |
| 4,278,837 A * | 7/1981 | Best | ................ | 713/190 |
| 4,319,079 A * | 3/1982 | Best | ................ | 713/190 |
| 4,465,901 A * | 8/1984 | Best | ................ | 713/190 |
| 4,481,578 A * | 11/1984 | Hughes et al. | ................ | 709/212 |
| 5,020,105 A * | 5/1991 | Rosen et al. | ................ | 705/66 |
| 5,261,003 A * | 11/1993 | Matsui | ................ | 380/264 |
| 5,438,622 A * | 8/1995 | Normile et al. | ................ | 380/46 |
| 5,671,275 A * | 9/1997 | Ezuriko | ................ | 713/190 |
| 5,937,063 A | 8/1999 | Davis | | |
| 5,995,623 A * | 11/1999 | Kawano et al. | ................ | 713/189 |
| 6,061,449 A * | 5/2000 | Candelore et al. | ................ | 380/28 |
| 7,203,842 B2 * | 4/2007 | Kean | ................ | 713/189 |

(Continued)

FOREIGN PATENT DOCUMENTS

JP        2003-66837       3/2003

OTHER PUBLICATIONS

ProfDredd, "6502 Machine Language," Jan. 26, 2003, Dredd Productions, Ltd.*

(Continued)

*Primary Examiner* — Beemnet W Dada
*Assistant Examiner* — Darren B Schwartz
(74) *Attorney, Agent, or Firm* — Staas & Halsey LLP

(57) ABSTRACT

A method of encrypting and decrypting a firmware used in electronic devices and an apparatus using the same. The firmware encryption method includes, receiving a predetermined special key data; generating an encryption key data from the predetermined special key data using a predetermined random number; generating an encryption data corresponding to firmware address information to be stored to a memory based on the encryption key data; and generating an encrypted firmware data by performing an XOR operation on the encryption data and firmware data to be stored in the firmware address.

23 Claims, 5 Drawing Sheets

U.S. PATENT DOCUMENTS

| | | |
|---|---|---|
| 2003/0033537 A1* | 2/2003 | Fujimoto et al. ............... 713/193 |
| 2003/0037248 A1* | 2/2003 | Launchbury et al. ......... 713/193 |
| 2003/0051160 A1 | 3/2003 | Selkirk et al. |
| 2003/0091185 A1* | 5/2003 | Swindlehurst et al. ......... 380/44 |
| 2003/0095659 A1* | 5/2003 | Ishihara et al. ................. 380/46 |
| 2003/0115471 A1 | 6/2003 | Skeba |
| 2003/0212886 A1* | 11/2003 | Sugiura ......................... 713/150 |
| 2004/0006703 A1* | 1/2004 | Kitani et al. .................. 713/193 |
| 2004/0034785 A1* | 2/2004 | Tai et al. ....................... 713/189 |
| 2004/0054907 A1* | 3/2004 | Chateau et al. ............... 713/175 |
| 2006/0265563 A1* | 11/2006 | Goettfert et al. .............. 711/164 |
| 2009/0164803 A1* | 6/2009 | Lundvall et al. .............. 713/190 |

OTHER PUBLICATIONS

Ekdahl, Patrik et al., "SNOW—a new stream cipher," Nov. 22, 2001, Department of Information Technology Lund University.*

Menezes et al. "Handbook of Applied Cryptography," CRC Press, Dec. 16, 1996, p. 194.*

* cited by examiner

FIRMWARE ENCRYPTING AND DECRYPTING METHOD AND AN APPARATUS USING THE SAME

CROSS-REFERENCE TO RELATED APPLICATION

This application claims the benefit of Korean Patent Application No. 2004-1414, filed on Jan. 9, 2004, in the Korean Intellectual Property Office, the disclosure of which is incorporated herein in its entirety by reference.

BACKGROUND OF THE INVENTION

1. Field of the Invention

The present invention relates to a method to encrypt and/or decrypt information and an apparatus using the same, and more particularly, to a method to encrypt and/or decrypt firmware used in electronic devices and an apparatus using the same.

2. Description of the Related Art

Firmware, which is installed in hardware of an electronic device, is a software (program or data) required to store information essential to an operation of the electronic device and/or store information required to perform a basic operation. Generally, after a source code is generated in C language or an assembler and compiled by a compiler, a binary coded firmware is stored in or is written onto a memory (for example, a recording medium, such as flash memory or ROM).

Referring to FIG. 1, a programmed firmware 110 is written to a flash ROM 130 using a ROM writer 120. Alternatively, referring to FIG. 2, a programmed firmware is downloaded to a flash ROM 230 from a computer 210 using a microprocessor 220.

Conventionally, since unencrypted firmware is written in and/or downloaded to a memory, it is relatively easy to illegally copy the firmware stored in the memory. Furthermore, a portion of the firmware can be used by illegally changing the firmware.

SUMMARY OF THE INVENTION

An aspect of the present invention provides a firmware encryption and/or decryption method to store an encrypted firmware to a memory and to decrypt the encrypted firmware when the firmware is used, and further provides an apparatus using the same.

According to an aspect of the present invention, a firmware encryption method is provided. The method includes: receiving a predetermined special key data; generating an encryption key data from the predetermined special key data using a predetermined random number; generating an encryption data corresponding to a firmware address information to be stored in a memory based on the encryption key data; and generating an encrypted firmware data by performing an XOR operation on the encryption data and firmware data to store the encrypted firmware data based on the firmware address.

Additional aspects and/or advantages of the invention will be set forth in part in the description which follows and, in part, will be obvious from the description, or may be learned by practice of the invention.

According to another aspect of the present invention, a firmware decryption method is provided. The method includes: reading a predetermined special key data stored in a memory upon determining that a condition to operate the firmware is satisfied; generating an encryption key data based on the predetermined special key data; generating an encryption data corresponding to a firmware address information to read firmware data from the memory; and generating a decrypted firmware data by performing an XOR operation on the encryption data and the firmware data read from the firmware address.

According to another aspect of the present invention, a firmware encryption apparatus is provided. The apparatus includes: an encryption key generator generating encryption key data from a predetermined input special key data using a predetermined random number; and a firmware encryption processing unit generating an encryption data corresponding to firmware address information based on the encryption key data and generating an encrypted firmware data by performing an XOR operation on the encryption data and firmware data to be stored to the firmware address.

According to another aspect of the present invention, a firmware decryption apparatus is provided. The apparatus includes: a memory storing an encrypted firmware and a predetermined special key data used in an encryption operation; a microprocessor reading the predetermined special key data from the memory upon determining that a condition to operate the firmware is satisfied, generating firmware address information to read the encrypted firmware from the memory and a read control signal and executing a program included in the encrypted firmware; an encryption key generator generating encryption key data from the predetermined special key data using a predetermined random number; and a firmware decryption processing unit generating an encryption data corresponding to the firmware address information using the encryption key data and generating decrypted firmware data by performing an XOR operation on the encryption data and the encrypted firmware data read from the firmware address.

BRIEF DESCRIPTION OF THE DRAWINGS

The above and/or other features and advantages of the present invention will become apparent, and more readily appreciated from the following description of exemplary embodiments, taken in conjunction with the accompanying drawings of which.

DETAILED DESCRIPTION OF THE PREFERRED EMBODIMENTS

Figure 1:
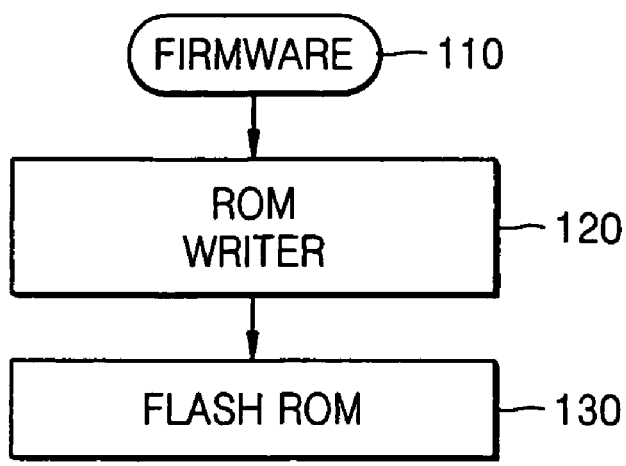
FIGS. 1 and 2 are block diagrams to illustrate conventional operations to store a firmware in a ROM.
Figure 2:
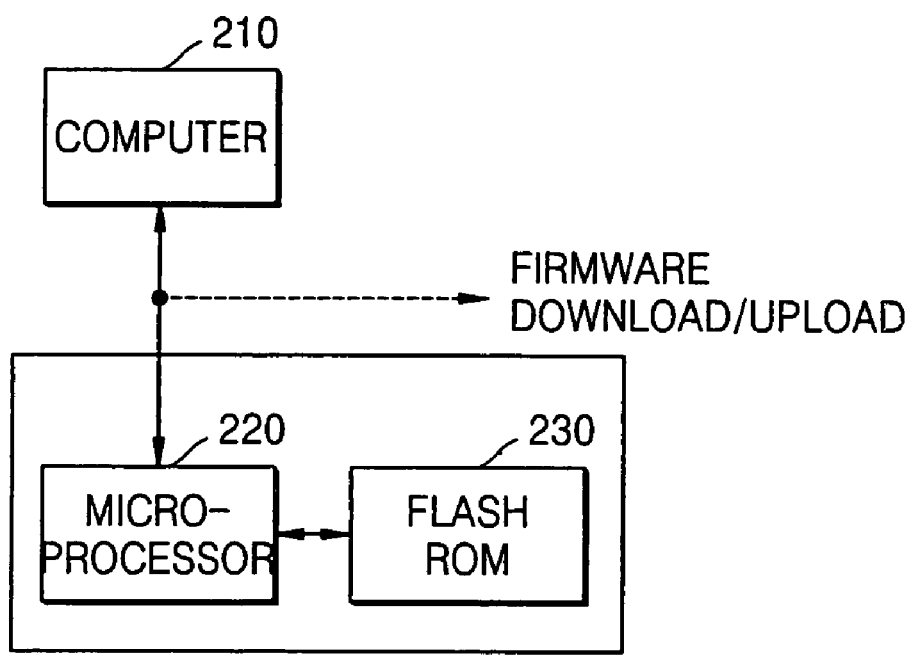

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
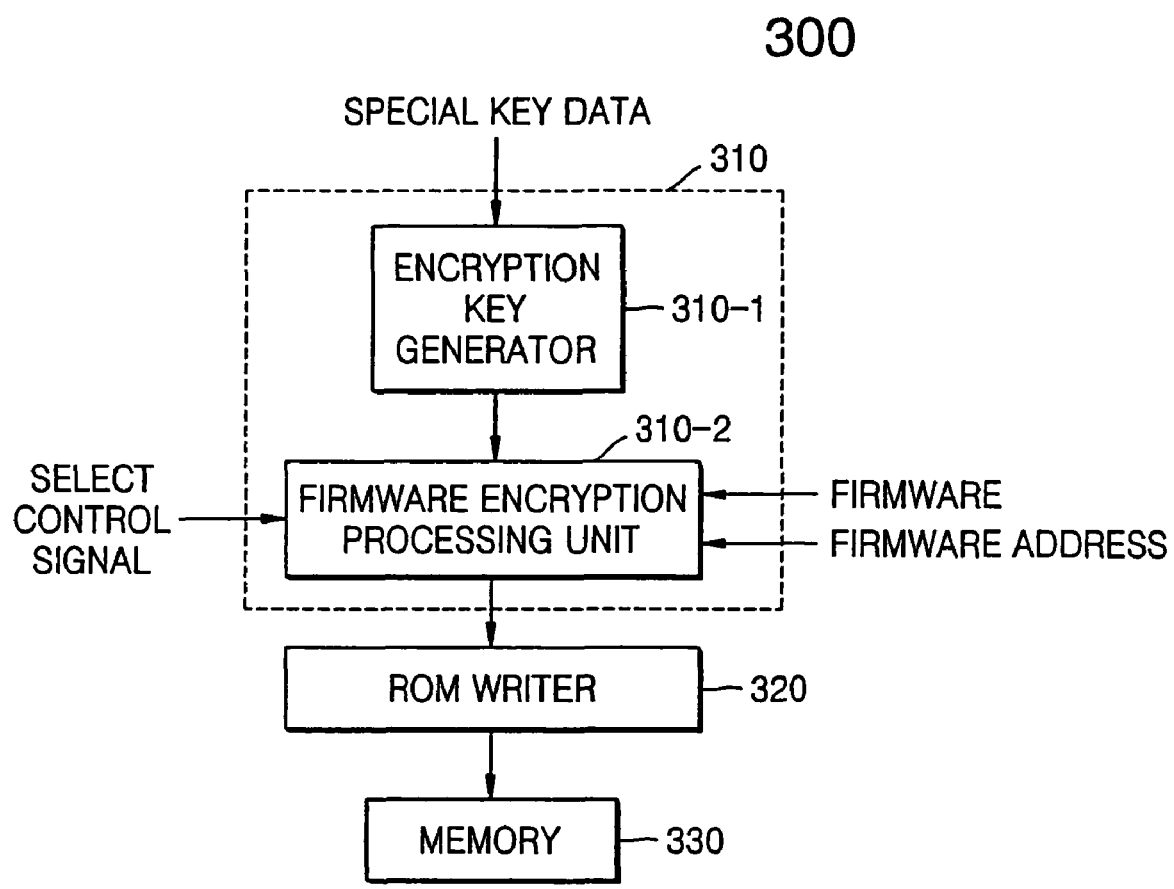
FIG. 3 is a block diagram of a firmware encryption apparatus according to an embodiment of the present invention.

FIG. 3 is a block diagram of a firmware encryption apparatus according to an embodiment of the present invention. Referring to FIG. 3, a firmware encryption apparatus 300 includes an encryption processing unit 310, a ROM writer 320, and a memory 330.

The encryption processing unit 310 includes an encryption key generator 310-1 and a firmware encryption processing unit 310-2.

The encryption key generator 310-1 receives 256-bit special key data SK[255:0] from an external device and generates a 32-bit encryption key data EK[31:0] using a predetermined random number. The encryption key data EK[31:0] has 32 bits, which is four bytes of firmware. According to the present embodiment, the special key data is in a 256-bit unit, however, the number of bits of the special key data can vary.

The firmware encryption processing unit 310-2 receives the encryption key data EK[31:0] generated by the encryption key generator 310-1, 8-bit firmware data D[7:0], and 16-bit firmware address information A[15:0]. The firmware address information A[15:0] is location information to be stored in the memory 330.

The firmware encryption processing unit 310-2 generates 8-bit encryption data TD[7:0] from the encryption key data EK[31:0] using the firmware address information A[15:0]. For example, the firmware encryption processing unit 310-2 generates the encryption data TD[7:0] according to values of the lowest 2 bits A[1:0] of the firmware address information A[15:0]. That is, when the A[1:0] equals "00", "01", "10", or "11", the encryption data TD[7:0] is equal to EK[31:24], EK[23:16], EK[15:8], or EK[7:0], respectively. Accordingly, the encryption data TD[7:0] may take 4 different values according to the firmware address information A[15:0].

The firmware encryption processing unit 310-2 generates encrypted firmware data ED[7:0] by performing an XOR operation to the encryption data TD[7:0] and to the firmware data D[7:0] to be stored in the firmware address from which the encryption data TD[7:0] is generated.

The encrypted firmware data ED[7:0] is written to the memory 330 by the ROM writer 320.

Figure 4:
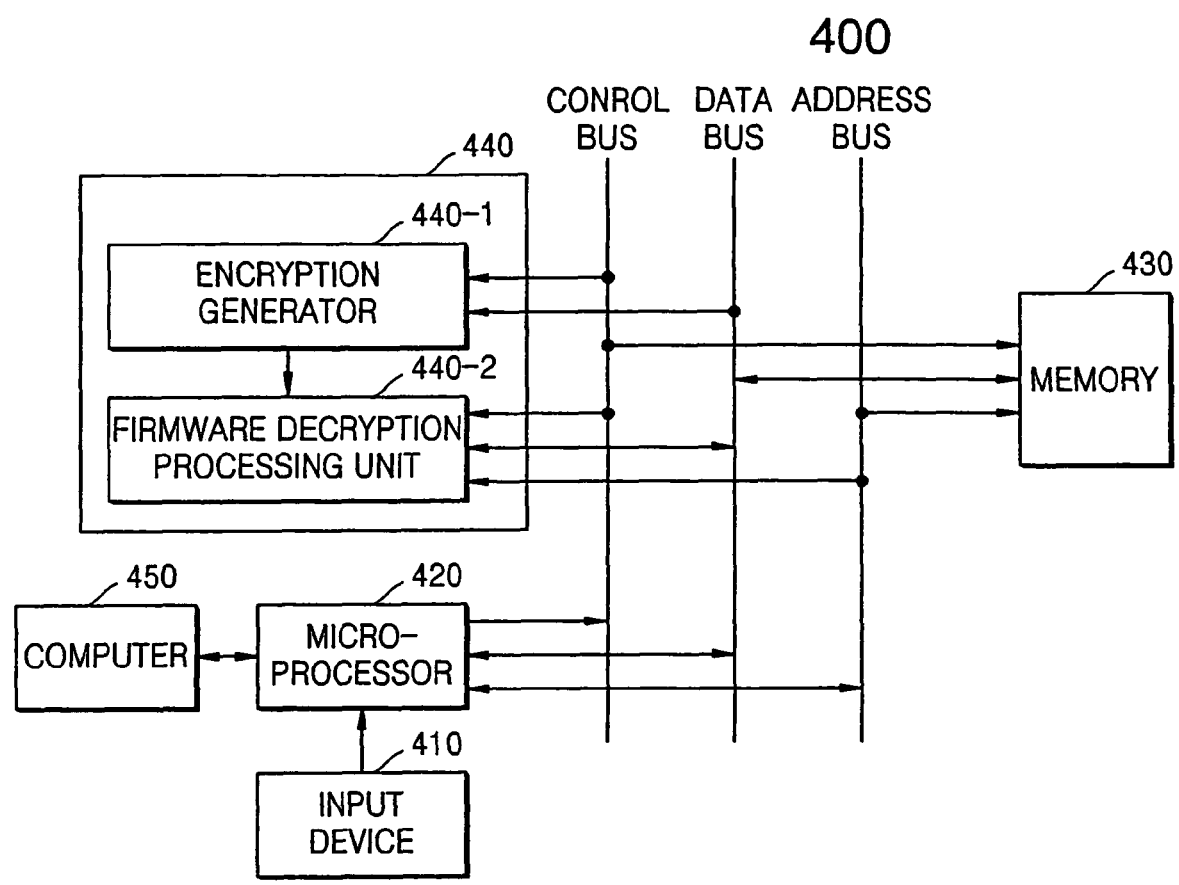
FIG. 4 is a block diagram of a firmware decryption apparatus according to an embodiment of the present invention.

FIG. 4 is a block diagram of a firmware decryption apparatus according to an embodiment of the present invention.

Referring to FIG. 4, a firmware decryption apparatus 400, according to an embodiment of the present invention, includes an input device 410, a microprocessor 420, a memory 430, and a decryption processing unit 440.

The decryption processing unit 440 includes an encryption key generator 440-1 and a firmware decryption processing unit 440-2.

According to an embodiment of the present invention, a computer 450 downloads to or uploads data from the memory 430 via the microprocessor 420.

The input device 410 inputs key commands to control an electronic device, and the microprocessor 420 controls the electronic device using firmware stored in the memory 430 in response to the key commands input from the input device 410.

Firmware encrypted by the firmware encryption apparatus 300 shown in FIG. 3 and the special key data SK[255:0] used in the encryption process are stored in the memory 430. According to an embodiment of the present invention, the memory 430 is flash ROM, a nonvolatile memory device.

The microprocessor 420 controls the electronic device using the firmware read from the memory 430 and decrypted, and upon determining that information input from the input device 410 and/or the computer 450 satisfies a condition to execute the firmware, the microprocessor 420 generates address information and a read control signal to read the special key data SK[255:0] from the memory 430. The microprocessor 420 generates address information and a read control signal to read the encrypted firmware.

The encryption key generator 440-1 receives the 256-bit special key data SK[255:0] read from the memory 430 and generates 32-bit encryption key data EK[31:0] using a random number. The encryption key data EK has 32 bits, which is four bytes of firmware.

The firmware decryption processing unit 440-2 receives the encryption key data EK[31:0] generated by the encryption key generator 440-1, an 8-bit encrypted firmware data ED[7:0] and a 16-bit firmware address information A[15:0] read from the memory 430. The firmware address information A[15:0] is address information to read the encrypted firmware from the memory 330.

The firmware decryption processing unit 440-2 generates an 8-bit encryption data TD[7:0] from the encryption key data EK[31:0] using the firmware address information A[15:0] using a similar method used for the encryption. That is, when the value of A[1:0], which are the lowest 2 bits of the firmware address information A[15:0], is "00", "01", "10", or "11", the encryption data TD[7:0] is equal to EK[31:24], EK[23:16], EK[15:8], or EK[7:0], respectively. Accordingly, the encryption data TD[7:0] may take 4 different values according to the firmware address information A[15:0].

The firmware decryption processing unit 440-2 generates decrypted firmware data D[7:0] by performing an XOR operation on the encryption data TD[7:0] and the encrypted firmware data ED[7:0] read from the firmware address from which the encryption data TD[7:0] is generated.

The decrypted firmware data D[7:0] is input to the microprocessor 420 via a data bus. Accordingly, the microprocessor 420 generates a control signal corresponding to the decrypted firmware and controls the electronic device.

Figure 5:
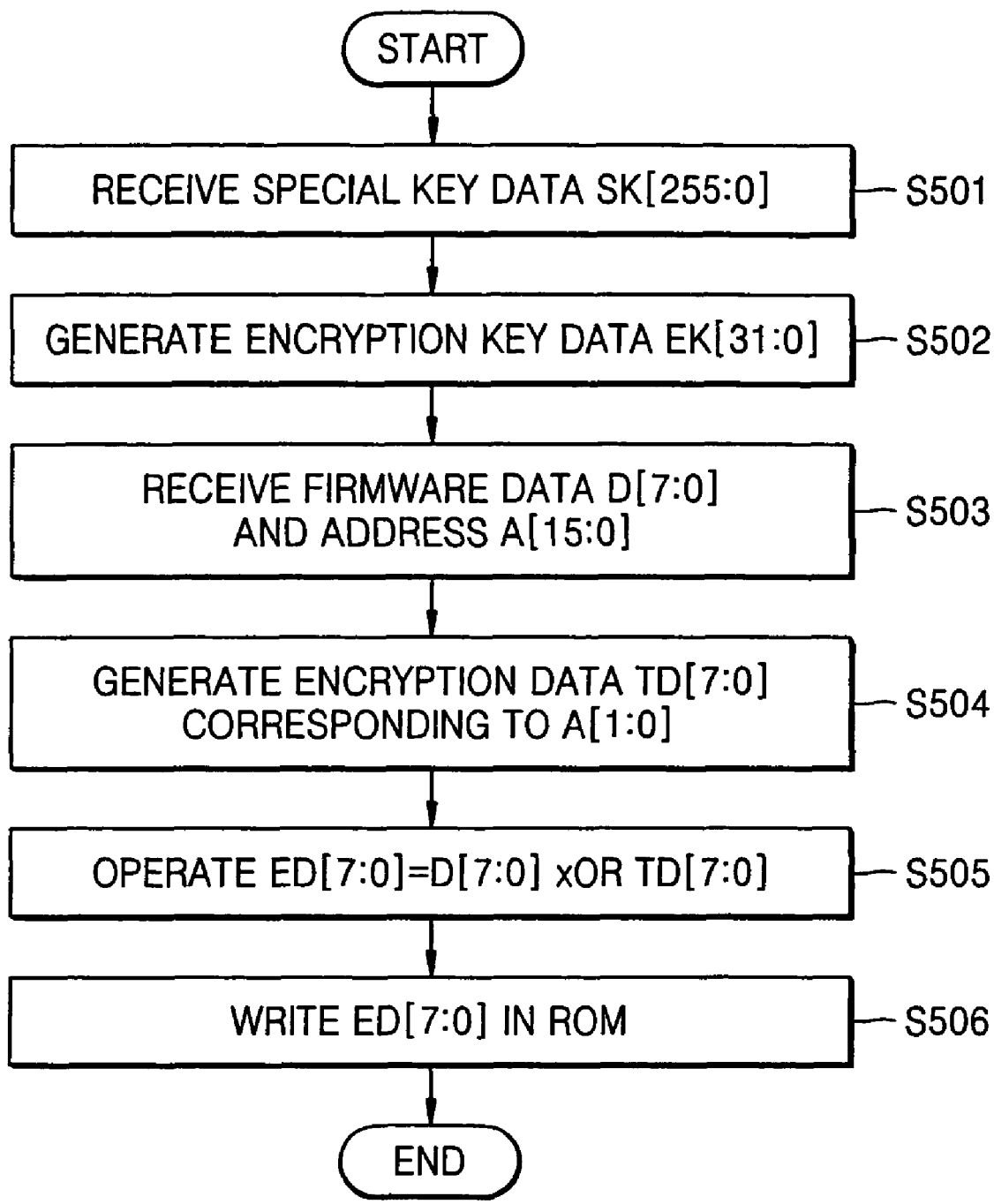
FIG. 5 is a flowchart of a firmware encryption method according to an embodiment of the present invention.
Figure 6:
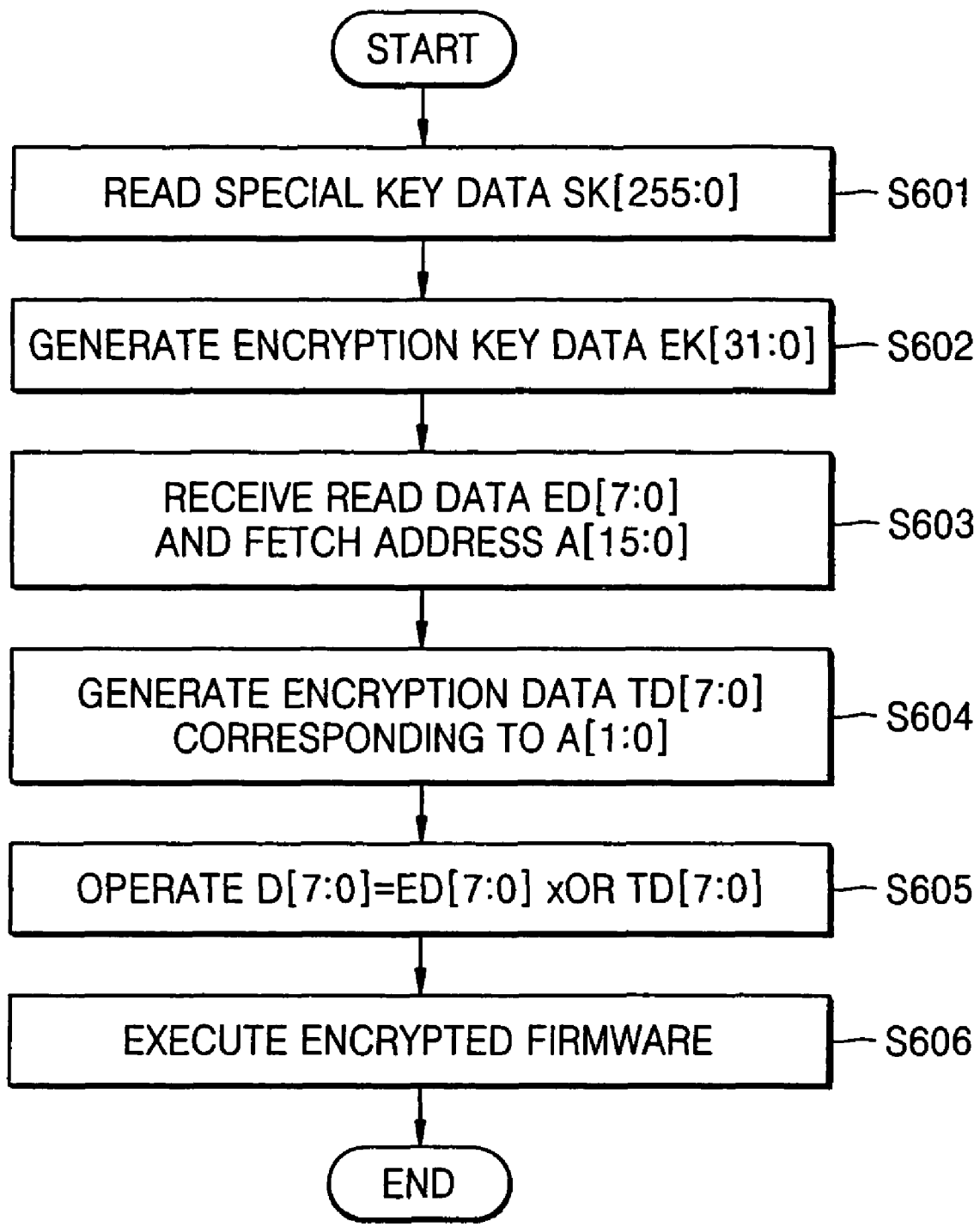
FIG. 6 is a flowchart of a firmware decryption method according to an embodiment of the present invention.

A firmware encryption method and a firmware decryption method according to an embodiment of the present invention will now be described with reference to flowcharts shown in FIGS. 5 and 6.

First, referring to FIG. 5, a firmware encryption method according to an embodiment of the present invention will be described.

A special key data SK to generate encryption key data is received in operation S501. For example, the special key data SK can be generated to have a 256-bit value.

When the special key data SK[255:0] is received, a 32-bit encryption key data EK[31:0] is generated using a predetermined random number in operation S502. The encryption key data EK, for example, is a 32-bit data, which is four bytes of firmware.

When the encryption key data EK[31:0] is generated, an 8-bit firmware data D[7:0] and a 16-bit firmware address information A[15:0] are received in operation S503.

An 8-bit encryption data TD[7:0] is generated from the encryption key data EK[31:0] based on the firmware address information A[15:0] in operation S504.

For example, the encryption data TD[7:0] may be generated according to values of A[1:0], which are the 2 lowest bits of the firmware address information A[15:0]. That is, when the A[1:0] is "00", "01", "10", or "11", the encryption data TD[7:0] including EK[31:24], EK[23:16], EK[15:8], or EK[7:0], respectively, is generated. Accordingly, the encryption data TD[7:0] may take 4 different values according to the firmware address information A[15:0].

An encrypted firmware data ED[7:0] is generated by performing an XOR operation on the encryption data TD[7:0] and the firmware data D[7:0] to be stored in the firmware address from which the encryption data TD[7:0] is generated in operation S505.

The encrypted firmware data ED[7:0] is written to the memory 330 by the ROM writer 320 in operation S506.

Next, referring to FIG. 6, a firmware decryption method according to an embodiment of the present invention will now be described.

Upon determining that a condition to execute firmware is satisfied, the microprocessor 420 reads special key data SK[255:0] from the memory 430 in operation 601. The special key data SK[255:0] is key data used to encrypt the firmware.

According to an aspect of the present invention, a 32-bit encryption key data EK[31:0] is generated from the special key data SK[255:0] using a similar random number generating operation used in the encryption process in operation S602.

When the encryption key data EK[31:0] is generated, an 8-bit encrypted firmware data ED[7:0] and a 16-bit firmware address information A[15:0] read from the memory 430 are received in operation S603.

An 8-bit encryption data TD[7:0] is generated from the encryption key data EK[31:0] based on the firmware address information A[15:0] in operation S604. That is, when the value of A[1:0], which are the lowest 2 bits of the firmware address information A[15:0], is "00", "01", "10", or "11", the encryption data TD[7:0] is EK[31:24], EK[23:16], EK[15:8], or EK[7:0], respectively. Accordingly, the encryption data TD[7:0] may take 4 different values according to the firmware address information A[15:0].

Decrypted firmware data D[7:0] is generated by performing an XOR operation on the encryption data TD[7:0] and the encrypted firmware data ED[7:0] read from the firmware address from which the encryption data TD[7:0] is generated in operation S605.

Accordingly, the microprocessor 420 controls the electronic device using the decrypted firmware in operation S606.

In the above embodiments, the decryption processing unit 440 is separate from the microprocessor 420 for convenience of description, however, the decryption apparatus may be designed such that the decryption processing block 440 is included in the microprocessor 420.

As described above, according to embodiments of the present invention, by storing encrypted firmware when the firmware is stored in a memory and decrypting the encrypted firmware when the firmware is used, illegally copying and changing the firmware is prevented.

The present invention can be realized as a method, an apparatus, and/or a system. When the present invention is realized as software, components of the present invention are necessarily code segments to execute required operations. A program or the code segments may be stored in a processor readable recording medium and transmitted as computer data signals combined with a carrier using a transmission medium and/or a communication network. The processor readable recording medium is any data storage device that can store or transmit data which can be thereafter read by a computer system. Examples of the processor readable recording medium include electronic circuits, semiconductor memory devices, a read-only memory (ROM), a flash memory, an erasable ROM, floppy disks, optical discs, hard discs, and an optical fiber media. The computer data signals include any signal which can be propagated via transmission media such as electronic network channels, optical fibers, air, electronic fields, RF networks Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A firmware encryption method, comprising:
   receiving predetermined special key data;
   generating an encryption key from the predetermined special key data using a predetermined random number generating process at an encryption key generator;
   generating encryption data by selecting some bits and not all bits of the encryption key according to firmware address information at a firmware encryption processing unit; and
   generating encrypted firmware data by performing an XOR operation on the encryption data and firmware data to be stored in a memory corresponding to the firmware address information, at the firmware encryption processing unit.

2. The method according to claim 1, wherein the encryption key is composed of N bytes of the firmware data, and N is a predetermined integer.

3. The method according to claim 1, wherein the encryption data is generated by selecting one byte from N bytes of the encryption key according to values of predetermined bits of the firmware address information.

4. A firmware decryption method, comprising:
   reading predetermined special key data stored in a memory upon determining that a condition to operate the firmware is satisfied;
   generating an encryption key based on the predetermined special key data at an encryption key generator;
   generating encryption data by selecting some bits and not all bits of the encryption key according to firmware address information at a firmware decryption processing unit; and
   generating decrypted firmware data by performing an XOR operation on the encryption data and firmware data stored in the memory corresponding to the firmware address information, at the firmware decryption processing unit.

5. The method according to claim 4, wherein the encryption key is composed of N bytes of the firmware data, and N is a predetermined integer.

6. The method according to claim 4, wherein the encryption data is generated by selecting a byte from N bytes of the encryption key according to values of predetermined bits of the firmware address information.

7. A firmware encryption apparatus, comprising:
   an encryption key generator generating an encryption key from a predetermined input special key data using a predetermined random number generating process; and
   a firmware encryption processing unit generating encryption data by selecting some bits and not all bits of the encryption key according to firmware address information and generating encrypted firmware data by performing an XOR operation on the encryption data and firmware data to be stored in a memory corresponding to the firmware address information.

8. The apparatus according to claim 7, wherein the encryption key is composed of N bytes of the firmware data, and N is a predetermined integer.

9. The apparatus according to claim 7, wherein the encryption data is generated by selecting one byte from N bytes of the encryption key according to values of predetermined bits of the firmware address information.

10. A firmware decryption apparatus comprising:
    a memory storing encrypted firmware and predetermined special key data;
    a microprocessor reading the predetermined special key data from the memory upon determining that a condition to operate the firmware is satisfied, generating firmware address information to read the encrypted firmware from the memory and a read control signal and executing a program included in the encrypted firmware;

an encryption key generator generating an encryption key from the predetermined special key data using a predetermined random number generating process; and a firmware decryption processing unit generating encryption data by selecting some bits and not all bits of the encryption key according to firmware address information and generating decrypted firmware data by performing an XOR operation on the encryption data and the encrypted firmware data stored in the memory corresponding to the firmware address information.

11. The apparatus according to claim 10, wherein the encryption key is composed of N bytes of the firmware data, and N is a predetermined integer.

12. The apparatus according to claim 10, wherein the encryption data is generated by selecting a byte from N bytes of the encryption key according to values of predetermined bits of the firmware address information.

13. The apparatus according to claim 7, wherein the predetermined special key data received by the encryption key generator is transmitted from an external device.

14. The apparatus according to claim 13, wherein the encryption key generator receives a 256 bit special key data as the predetermined special key data, and generates a 32 bit data as the encryption key data.

15. The apparatus according to claim 14, wherein the 32 bit data generated as the encryption key includes an 8 bit data as the firmware data and a 16 bit data as the firmware address information.

16. The apparatus according to claim 15, wherein the encryption data generated by the firmware encryption processing unit is based on lowest 2 bits of the firmware address.

17. The apparatus according to claim 7, further comprising:

a ROM writer to write the encrypted firmware data to a memory.

18. A method to encrypt firmware data of an electronic device, comprising:

generating encryption data by selecting some bits and not all bits of an encryption key according to firmware address information at a firmware encryption processing unit, the encryption key being generated from predetermined special key data using a random number generating process; and encrypting the firmware data by performing an XOR operation on the encryption data and the firmware data to be stored in a memory corresponding to the firmware address information, at the firmware encryption processing unit, and storing the encrypted firmware data to the address in memory.

19. The method according to claim 18, wherein the encryption data is generated by selecting one byte from N bytes of the encryption key according to values of predetermined bits of the address in the memory.

20. A method to decrypt encrypted firmware data of an electronic device, comprising:

generating an encryption key using predetermined special key data stored in a memory upon determining that a condition to use the encrypted firmware data is satisfied at an encryption key generator;

generating encryption data by selecting some bits and not all bits of an encryption key according to firmware address information at a firmware decryption processing unit; and decrypting the encrypted firmware data by performing an XOR operation on the generated encryption data and the encrypted firmware data stored in the memory corresponding to the firmware address information, at the firmware decryption processing unit.

21. The method according to claim 20, wherein the encryption key is composed of predetermined bytes of the firmware data.

22. A non-transitory computer readable medium recorded with a program to cause a processor to execute a firmware encryption operation, the operation comprising:

generating encryption data corresponding to an address in a memory based on some bits and not all bits of an encryption key generated from a predetermined special key data using a random number generating process; and encrypting the firmware data by performing an XOR operation on the encryption data and the firmware data to be stored in the memory corresponding to the address, and storing the encrypted firmware data to the address in memory.

23. A non-transitory computer readable medium recorded with a program to cause a processor to execute a firmware decryption operation, the operation comprising:

generating an encryption key using predetermined special key data stored in a memory upon determining that a condition to use encrypted firmware data is satisfied;

generating encryption data by selecting some bits and not all bits of the encryption key according to firmware address information; and decrypting the encrypted firmware data by performing an XOR operation on the generated encryption data and the encrypted firmware data stored in the memory corresponding to the firmware address information.

* * * * *